United States Patent
Nanjappan

(10) Patent No.: US 11,330,418 B2
(45) Date of Patent: *May 10, 2022

(54) LONE WORKER SAFELY CHECK

(71) Applicant: Otis Elevator Company, Farmington, CT (US)

(72) Inventor: Ezhil Nanjappan, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/628,532

(22) Filed: Jun. 20, 2017

(65) Prior Publication Data

US 2018/0367970 A1    Dec. 20, 2018

(51) Int. Cl.
*G08B 29/04* (2006.01)
*H04M 11/04* (2006.01)
(Continued)

(52) U.S. Cl.
CPC .............. *H04W 4/90* (2018.02); *G08B 21/02* (2013.01); *G08B 21/187* (2013.01); *G08B 25/08* (2013.01); *G08B 29/04* (2013.01); *H04L 67/18* (2013.01); *H04M 11/04* (2013.01); *H04W 4/027* (2013.01); *G01P 15/036* (2013.01)

(58) Field of Classification Search
CPC ........ H04W 4/22; H04W 4/027; H04L 67/18; G01P 15/036
See application file for complete search history.

(56) References Cited

U.S. PATENT DOCUMENTS 6,494,831 B1 * 12/2002 Koritzinsky ........ G06F 19/3412
  128/903
7,340,240 B2    3/2008 McDonald
(Continued)

FOREIGN PATENT DOCUMENTS

CN    1700259 A    11/2005
CN    201611516 U    10/2010
(Continued)

OTHER PUBLICATIONS

Checkmate, "Working Alone Features", pp. 1-9, retrieved Jun. 19, 2017, retrieved from the internet http://www.proteleccheckmate.com/products/checkmate-working-alone/features/.
(Continued)

*Primary Examiner* — Muhammad Adnan
(74) *Attorney, Agent, or Firm* — Cantor Colburn LLP

(57) ABSTRACT

A lone worker system for performing a safety check is provided. The lone worker system includes a mobile device. The mobile device includes a memory storing a safety check application thereon and a processor. The processor is coupled to the memory and executes the safety check application. The processor initiates the safety check application with respect to the service call. The safety check application executes a use-case safety monitoring of the mobile device with respect to a service call to implement the safety check. The use-case safety monitoring detects an emergency situation with respect to a connectivity of the mobile device to a server, an activity of the mobile device, and a motion of the mobile device.

14 Claims, 4 Drawing Sheets

(51) Int. Cl.
  *G08B 25/08* (2006.01)
  *G08B 21/02* (2006.01)
  *G08B 21/18* (2006.01)
  *H04W 4/90* (2018.01)
  *H04W 4/02* (2018.01)
  *H04L 67/52* (2022.01)
  *G01P 15/03* (2006.01)

(56) References Cited

U.S. PATENT DOCUMENTS

| | | | |
|---|---|---|---|
| 8,718,594 B2 | 5/2014 | Braznell | |
| 9,324,225 B2 | 4/2016 | Yang et al. | |
| 9,438,682 B2 | 9/2016 | Hornor et al. | |
| 9,558,641 B2 | 1/2017 | Brasch et al. | |
| 2007/0178909 A1* | 8/2007 | Doyle | G01S 5/0027 455/456.1 |
| 2009/0247137 A1* | 10/2009 | Awad | H04M 3/2227 455/418 |
| 2013/0065569 A1* | 3/2013 | Leipzig | G06F 9/453 455/416 |
| 2014/0114824 A1* | 4/2014 | Kong | G06Q 10/1091 705/32 |
| 2014/0266702 A1* | 9/2014 | Forster-Knight | H04W 4/12 340/539.13 |
| 2014/0333432 A1* | 11/2014 | Armitage | G08B 21/0261 340/539.11 |
| 2015/0123787 A1* | 5/2015 | Watson | G08B 21/0415 340/539.13 |
| 2015/0194032 A1 | 7/2015 | Wright | |
| 2016/0049068 A1* | 2/2016 | Ben-Porath | H04W 4/90 340/539.13 |
| 2017/0004695 A1 | 1/2017 | Brasch et al. | |

FOREIGN PATENT DOCUMENTS

| | | |
|---|---|---|
| CN | 104778816 A | 7/2015 |
| CN | 105791547 A | 7/2016 |
| CN | 205881110 U | 1/2017 |
| CN | 106485881 A | 3/2017 |
| EP | 2006815 A1 | 12/2008 |
| GB | 2518424 A | 3/2015 |
| WO | 2008037092 A1 | 4/2008 |
| WO | 2011069265 A1 | 6/2011 |
| WO | 2012156722 A1 | 11/2012 |

OTHER PUBLICATIONS

Geopro, "Lone Worker Emergency Alerting and Monitoring Solution", pp. 1-5, retrieved Jun. 19, 2016, retrieved from the internet http://www.geoprosolutions.com/en/work-alone-monitoring-solution-features/.
Kay Radio, "Ensure the Well-Being of Lone Workers", pp. 1-21, retrieved Jun. 19, 2017, retrieved from the internet http7/www.kayradio.com/motorola/mototrbo/applications/situational-awareness.htm.
Sky Guard, "Lone Worker Safety on Your Mobile Phone", pp. 1-2, retrieved Jun. 19, 2017, retrieved from the internet http://skyguard.co.uk/voice-memo-timer/.
Staysafe, "Lone Worker Phone App Solution", pp. 1-5, retrieved Jun. 19, 2017, retrieved from the internet https://www.staysafeapp.com/lone-worker-solution/#/solutionFeatures/solution/5.
Extended European Search Report for European Application No. 18178545.2 dated Oct. 16, 2018; 7 Pages.
Chinese Office Action CN 201810633073.2, dated Apr. 15, 2020, 10 pages.
Chinese Office Action for Application No. 201810633073.2; dated Nov. 2, 2020; 13 Pages.

* cited by examiner

LONE WORKER SAFELY CHECK

BACKGROUND

In general, building mechanics and elevator technicians employ a variety of safety equipment when responding to a service call. At present, while conventional safety systems extend to harnesses, there is no mechanism for automatic tracking of a mechanic's/technician's location and/or escalating the service call in case of emergency (e.g., a fall).

BRIEF DESCRIPTION

According to one or more embodiments, a lone worker system for performing a safety check is provided. The lone worker system comprises a mobile device comprising: a memory storing a safety check application thereon; and a processor, coupled to the memory, executing the safety check application; and wherein the processor initiates the safety check application with respect to the service call, wherein the safety check application executes a use-case safety monitoring of the mobile device with respect to a service call to implement the safety check, wherein the use-case safety monitoring detects an emergency situation with respect to one or more of a connectivity of the mobile device to a server, an activity of the mobile device, and a motion of the mobile device.

According to one or more embodiments or the above lone worker system, the safety check application can activate an emergency mode that escalates the service call in response the detection of the emergency situation by the use-case safety monitoring.

According to one or more embodiments or any of the above lone worker systems, the safety check application can execute an emergency alert at a conclusion of a count by an emergency timer of the safety check application under the emergency mode.

According to one or more embodiments or any of the above lone worker systems, the emergency alert can comprise a notification to at least one of a supervisor, a call center operator, and emergency responder.

According to one or more embodiments or any of the above lone worker systems, the notification can comprise at least one of an automatic phone call, an automatic email, and an automatic text message.

According to one or more embodiments or any of the above lone worker systems, the safety check application can detect a location of the mobile device.

According to one or more embodiments or any of the above lone worker systems, the lone worker system can comprise the server, and the server can be in communication with the mobile device.

According to one or more embodiments or any of the above lone worker systems, the server can execute an emergency call based on a communication from the safety check application of the mobile device under an emergency mode.

According to one or more embodiments or any of the above lone worker systems, the server can execute an emergency call based on the mobile device being out-of-communication at a conclusion of a count by an emergency timer.

According to one or more embodiments or any of the above lone worker systems, the safety check application can determine the connectivity of the mobile device to the server by determining a location of the mobile device.

According to one or more embodiments, a processor-implemented method for performing a safety check is provided. The processor-implemented method is implemented by a safety check application stored on a memory of a mobile device. The safety check application is executed by a processor of the mobile device and the processor is coupled to the memory. The processor-implemented method comprises initiating, by the processor, the safety check application with respect to the service call; and executing, by the safety check application, a use-case safety monitoring of the mobile device with respect to a service call to implement the safety check, wherein the use-case safety monitoring detects an emergency situation with respect to one or more of a connectivity of the mobile device to a server, an activity of the mobile device, and a motion of the mobile device.

According to one or more embodiments or the above processor-implemented method, the safety check application can activate an emergency mode that escalates the service call in response the detection of the emergency situation by the use-case safety monitoring.

According to one or more embodiments or any of the above processor-implemented methods, the safety check application can execute an emergency alert at a conclusion of a count by an emergency timer of the safety check application under the emergency mode.

According to one or more embodiments or any of the above processor-implemented methods, the emergency alert can comprise a notification to at least one of a supervisor, a call center operator, and emergency responder.

According to one or more embodiments or any of the above processor-implemented methods, the notification can comprise at least one of an automatic phone call, an automatic email, and an automatic text message.

According to one or more embodiments or any of the above processor-implemented methods, the safety check application can detect a location of the mobile device.

According to one or more embodiments or any of the above processor-implemented methods, the server can be in communication with the mobile device.

According to one or more embodiments or any of the above processor-implemented methods, the server can execute an emergency call based on a communication from the safety check application of the mobile device under an emergency mode.

According to one or more embodiments or any of the above processor-implemented methods, the server can execute an emergency call based on the mobile device being out-of-communication at a conclusion of a count by an emergency timer.

According to one or more embodiments or any of the above lone worker systems, the safety check application can determine the connectivity of the mobile device to the server by determining a location of the mobile device.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide a robust and efficient lone worker system, method, and/or computer program product (herein collectively referred to as lone worker system) that tracks and monitors building mechanics and elevator technicians in case of an emergency. The lone worker system utilizes triggers based on an activity in/of a mobile device, a mobile device location, a service call duration, etc. to escalate a normal situation to an emergency mode. Once in an emergency mode, the lone worker system can send notifications to supervisors, call center operators, and emergency responders with respect to a length of time the lone worker system has been in that emergency mode or other factors.

Figure 1:
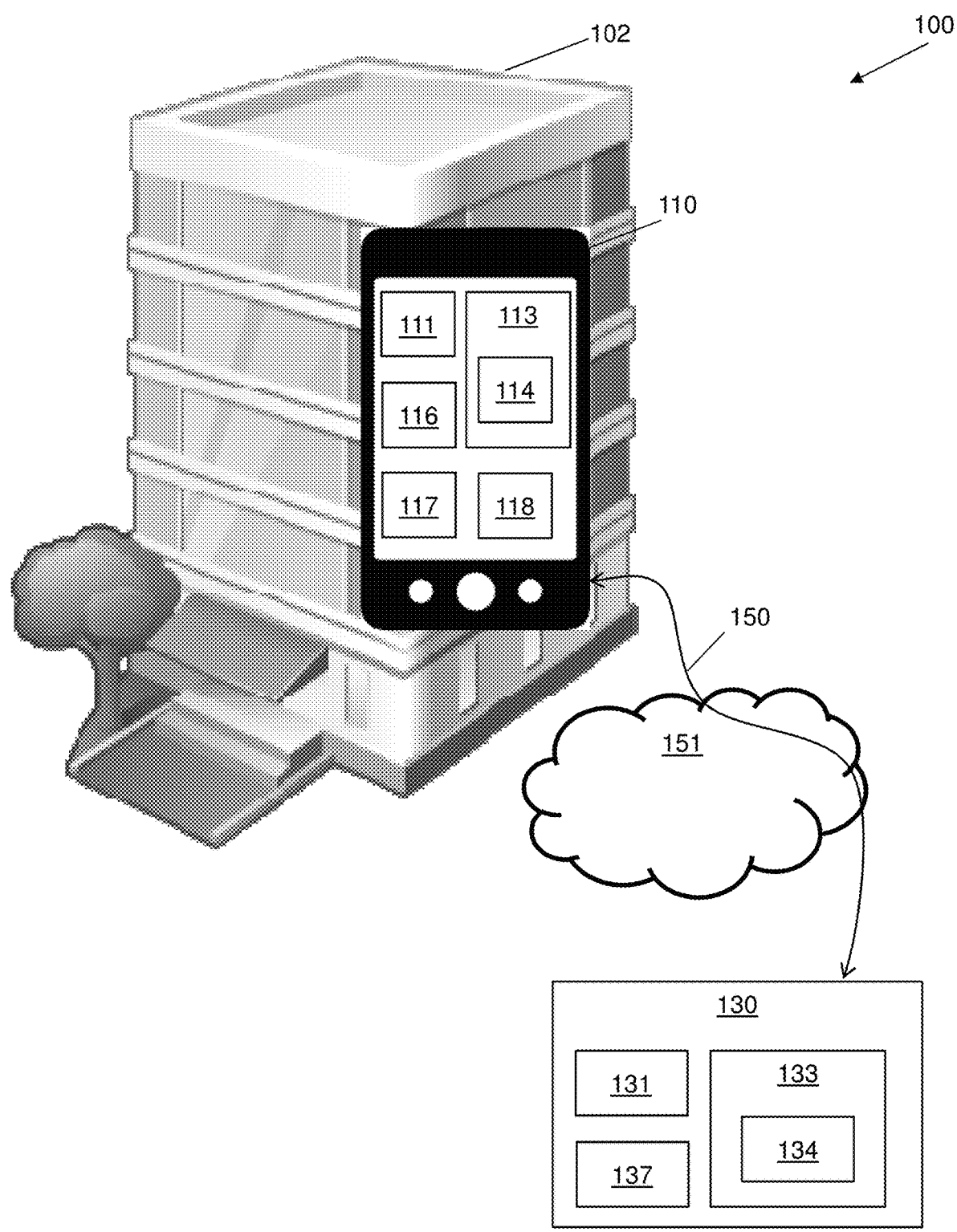
FIG. 1 depicts a lone worker system according to one or more embodiments.

FIG. 1 depicts a lone worker system 100 according to one or more embodiments. The lone worker system 100 can be an electronic, computer framework comprising and/or employing any number and combination of computing device and networks utilizing various communication technologies, as described herein. The lone worker system 100 can be scalable, extensible, and modular, with the ability to change to different services or reconfigure some features independently of others.

The lone worker system 100 can function in a building 102 within which a mobile device 110 is located. The building 102 can be any residential and/or commercial structure, such as a high-rise, an apartment complex, a school, a house, a factory, stadium, a warehouse, concert venue, a shopping mall, a sports venue, etc., that includes machinery, such as an escalator or an elevator, that requires maintenance by a building mechanic and an elevator technician.

The mobile device 110 can be any computing device comprising one or more of a processor 111, a memory 113, a safety check application 114, a sensor 116, a transceiver 117, and a global positioning receiver 118. Examples of the mobile device 110 include, but are not limited to, tablet computers, smartphones, and smartwatches. In accordance with one or more embodiments, the global positioning receiver 118 may be optional. The processor 111 (also referred to as a processing circuit) can be coupled via a system bus to the memory 113 and various other components of the mobile device 110.

The memory 113 is an example of a tangible storage medium readable. The memory 113 can include a read only memory (ROM) and a random access memory (RAM). The ROM is coupled to the system bus and may include a basic input/output system (BIOS), which controls certain basic functions of the mobile device 110. The RAM is read-write memory coupled to the system bus for use by the processor 111.

Software for execution by the lone worker system 100 may be stored in the memory 113 (e.g., the memory 113 can store the safety check application 114). The software is stored by the memory 113 as instructions for execution by the processor 111 to cause the lone worker system 100 to operate, such as described herein with reference to FIGS. 2-4. Note that the software can be implemented as computer program product, and the execution of computer program products is discussed in more detail herein.

The safety check application 114 tracks and monitors building mechanics and elevator technicians in case of an emergency. An emergency is a scenario where the building mechanic or the elevator technician is in danger of injury or death, such as fall down an elevator shaft or some other threatening situation. Thus, the safety check application 114 can operate with respect to one or more safety protection modes (e.g., in accordance with one or more embodiments, a set of three safety protection modes are operated simultaneously by the safety check application 114). Each of the one or more safety protection modes can operate, such that the mobile phone checks-in with the server 131 every once in a while, as further described herein.

According to one or more embodiments, the one or more safety protection modes can comprise a connectivity mode (e.g., disconnected for a predefined time or longer), an activity mode (e.g., inactivity for a predefined time or longer), and a motion mode (e.g., swift movement at or above a benchmark value) to identify emergencies. Each mode can escalate a normal situation to an emergency mode based on a predefined condition and/or after a predefined amount of time. The safety check application 114 can send notifications to supervisors, call center operators, and emergency responders (who can assist with or resolve the emergency) once one of the safety protection modes escalates to the emergency mode.

The connectivity mode can indicate an emergency with respect to whether the whether the mobile device 110 is disconnected and for how long (e.g., a disconnection event). A disconnected mobile device 110 can indicate that the elevator technician or building mechanic within a location that a wireless signal cannot reach. In turn, if the mobile device 110 remains disconnected and the elevator technician or building mechanic does not check-in, it may be beneficial to raise an alarm (escalate to the emergency mode under which notifications may be initiated). In this way, elevator technicians and building mechanics can be required to leave a dead zone, receive a connection via the mobile device 110, and send a notification through the mobile device 110 to prove that they remain safe while working.

The activity mode can indicate an emergency because an idle mobile device 110 (e.g., inactive mobile device event) may indicate that the elevator technician or building mechanic is disabled, unconscious, or separated from the mobile device 110. In turn, if the mobile device 110 remains inactive and the elevator technician or building mechanic does not check-in, it may be beneficial to raise an alarm (escalate to the emergency mode under which notifications may be initiated).

Motion mode can indicate an emergency because swift movement of the mobile device 110 (e.g., fall motion event) may indicate that the elevator technician or building mechanic has fallen. In turn, it may be beneficial to raise an alarm (escalate to the emergency mode under which notifications may be initiated).

According to one or more embodiments, the safety check application 114 can activate warning alerts (e.g., "are you safe") at predefined time intervals (e.g., once every two hours) by sound and/or vibrating through the mobile device 110 or in response to detecting any escalation by one of the safety modes. The safety check application 114 can execute as a background service to detect usage that resets the warning alerts (e.g., automatically reset a time if the mobile device 110 is used during the predefined time interval). Note that the predefined time intervals and the warning alerts can be reset by building mechanic/elevator technician driven activity (e.g., manual reset).

In addition, the safety check application 114 can, in an emergency, automatically trigger an emergency alert or call (e.g., a notification) when a shaking of the mobile device 110 is detected and if the mobile device 110 is in a locked state. Further, the safety check application 114 can automatically detect a fall (utilizing the sensor 116) based on a speed detection against gravity. The speed detection against gravity can be with respect to predefined ranges, such that one or more benchmark values demark one or more predefined ranges (e.g., a first predefined range of 0 to 2.74 meters per second and a second predefined range 2.75 meters per second to 9.8 meters per second) as further described herein. For example, when the sensor 116 detects that the mobile phone has performed a swift movement in the second predefined range would triggers the emergency alert. According to one or more embodiments, the safety check application 114 can implement a grace period (e.g., one minute, five minutes, ten minutes, fifteen minutes, etc.) where the sending of notifications are delayed with respect to any escalation.

The sensor 116 can be an electro-mechanical component that detects events or changes in an environment and outputs the events or changes as sensor signals to other components of the safety check application 114. In accordance with one or more embodiments, the sensor 116 can be an accelerometer that detects/measures an acceleration of the mobile device 110. For example, the sensor 116 can be utilized by the safety check application 114 to detect an acceleration or rate of change of velocity of the mobile device 110 with respect to gravity (on a range of Zero to approximately 9.81 meters per second squared).

The transceiver 117 can be input/output (I/O) and/or communication adapter coupled to the system bus of the mobile device 110. For example, the I/O adapter may be a small computer system interface (SCSI) adapter. The transceiver 117 can communicate signals through wired or wireless connections. The global positioning receiver 118 can be a component that operates with respect to any global navigation satellite system and/or any cell tower based positioning system to acquire geolocation and time information of the mobile device 110.

The lone worker system 100 can also comprise a server 130, which can be any computing device comprising one or more of a processor 131, a memory 133, a remote safety application 134, and a transceiver 137. Note that components of the server 130 that are similar to components of the mobile device 110 are not reintroduced for ease of explanation. The server 130 can operate in a similar matter as the mobile device 110, in view of receiving communications from the mobile device 110.

For instance, the mobile device 110 and the server 130 can communicate via a connection 150 supported by one or more networks (such as network 151 as shown in FIG. 1). The one or more networks can include, but are not limited to, IP Network, Modem, Wi-Fi, mobile communication (e.g., GSM), satellite, cellular, etc. Note that each item of FIG. 1 can be representative of one or more of that item such that, for example, the mobile device 110 can comprise one or more processors 111, one or more memories 113, etc.

That is, the server 130 can utilize the remote safety application 134 to track and monitor building mechanics and elevator technicians in case of an emergency. For example, the remote safety application 134 can utilize any escalation with respect to whether communications indicating one or more of a connectivity mode, an activity mode, and a motion mode are received. In turn, the remote safety application 134 can send notifications to supervisors, call center operators, and emergency responders in case of emergency.

Figure 2:
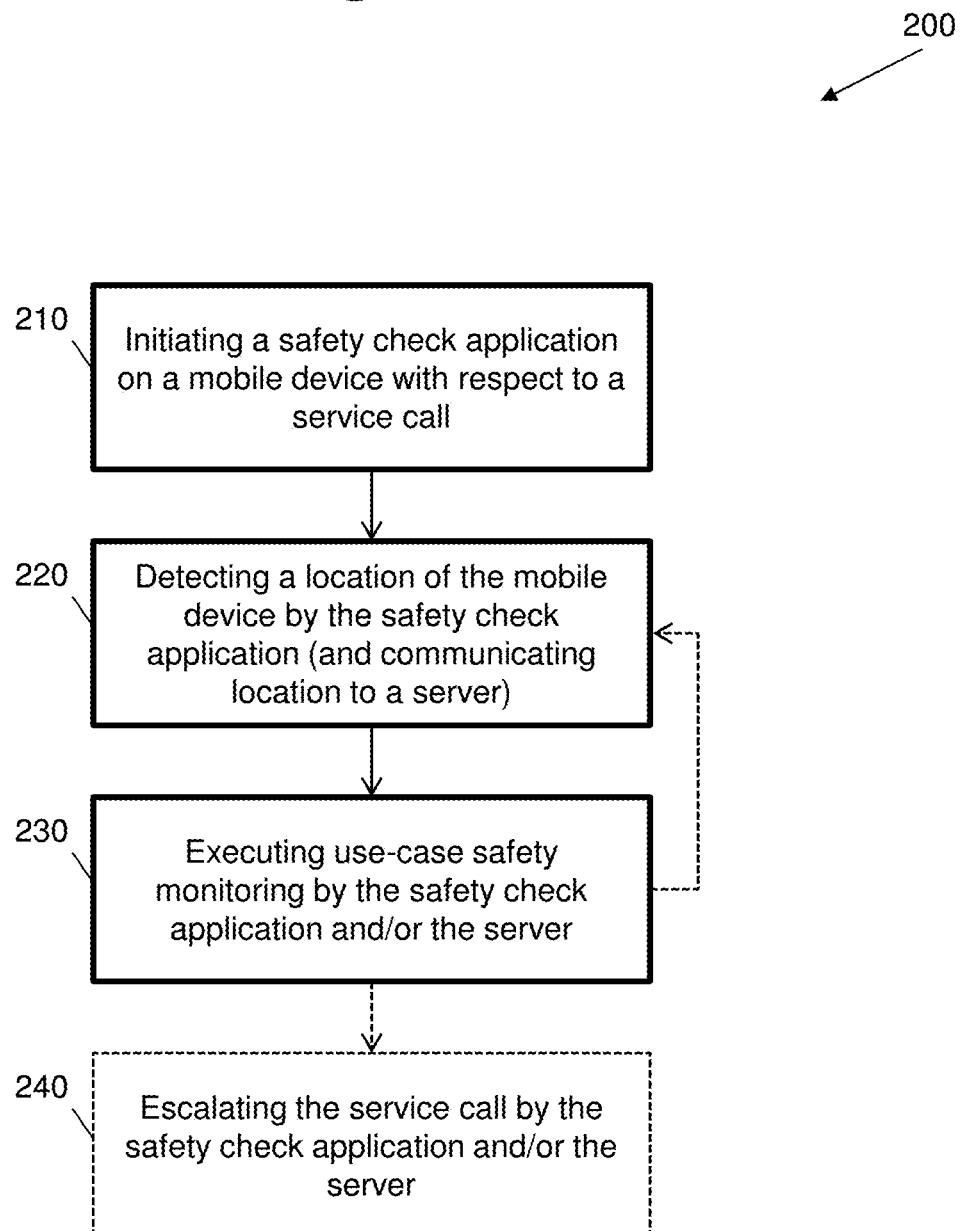
FIG. 2 depicts a process flow with respect to a lone worker system according to one or more embodiments.

Turning now to FIG. 2, a process flow 200 performing a safety check with respect to a lone worker system 100 is depicted according to one or more embodiments. The process flow 200 begins at block 210, where the processor 111 initiates the safety check application 114 on the mobile device 110 with respect to a service call.

According to one or more embodiments, when a building mechanic or elevator technician receives a call to service an elevator (e.g., service call), that building mechanic or elevator technician can utilize the mobile device 110 to activate the safety check application 114. Further, the building mechanic or elevator technician can manually sign into the safety check application 114 at the start of a workday or at an arrival at the jobsite. Once activated, the building mechanic or elevator technician can enter an identification of the service call, which associates the location of the elevator, the estimated time of repair or replacement, and/or other credentials with the operations of the safety check application 114.

According to one or more embodiments, the safety check application can automatically sign in at the start of a workday or at an arrival at the jobsite. Once activated, the safety check application can automatically download the identification of the service call, the estimated time of repair or replacement, and/or other credentials with the operations of the safety check application 114.

According to one or more embodiments, the safety check application 114 on the mobile device 110 can be initiated remotely by communications via the connection 150 from the processor 131 of the server 130 (with respect to a service call). In this way, if the remote safety application 134 does not receive any communications from the safety check application 114, the server 130 can execute an emergency alert or call based on the mobile device 110 being out-of-communication or disconnected at a conclusion of a count by a timer or an emergency timer within the server 130 (e.g., a timer of the remote safety application 134). The emergency timer can comprise one or more connection timers, activity timers, and motion timers. The emergency alert or call can include sending notifications to supervisors, call center operators, and emergency responders. Notifications can be an automatic phone call, an automatic email, an automatic text message, etc.

At block 220, the safety check application 114 detects a location of the mobile device 110. The safety check application 114 can detect the location of the mobile device 110 by utilizing the global positioning receiver 118 or other mechanisms described herein. The location can be communicated to the server 130 (e.g., the remote safety application 134).

At block 230, the safety check application 114 executes a use-case safety monitoring. The use-case safety monitoring can also be executed by the remote safety application 134. The use-case safety monitoring of the mobile device 110 with respect to the service call is an implementation of one or more safety modes while the building mechanic or elevator technician is working on the service call. In operation, the use-case safety monitoring by the safety check application 114 detects a condition indicating an emergency with respect to one or more connectivity, activity, and motion modes. Once the condition is detected, the process flow 200 proceeds to block 240.

At block 240, the safety check application 114 escalates the service call. In this regard, the safety check application 114 can activate an emergency mode. The emergency mode is an operation state, under the connectivity, activity, and motion modes of the safety check application 114, that indicates that an emergency may be occurring or may have occurred at the location of the service call. Once the emergency mode activated, an emergency timer of the safety check application 114 can perform a count that provides the building mechanic or elevator technician time to de-escalate the service call and confirm that no emergency exists.

According to one or more embodiments, the safety check application 114 can execute the emergency alert or call at a conclusion of the count by the emergency timer. Further, the server 130 can also execute the emergency alert or call on behalf of the safety check application 114 upon receiving a communication via the connection 150 from the safety check application 114. With respect to the connectivity mode, if the remote safety application 134 of the server 130 does not receive any communications from the safety check application 114, the server 130 can execute an emergency alert or call based on the mobile device 110 being out-of-communication or disconnected at a conclusion of a count by the emergency timer within the server 130.

Figure 3:
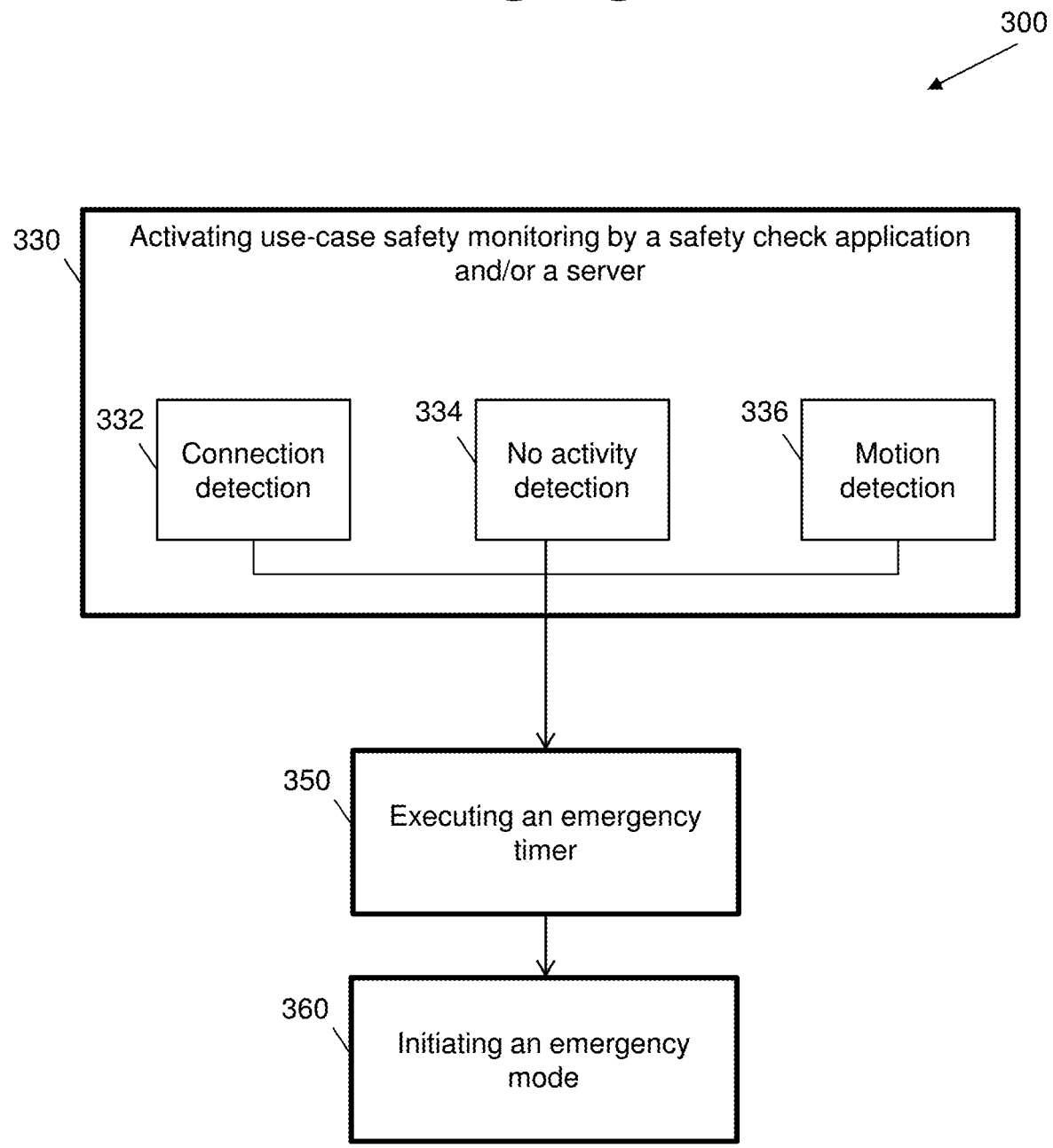
FIG. 3 depicts a process flow with respect to a lone worker system according to one or more embodiments.

Turning now to FIG. 3, a process flow 300 for performing a safety check with respect to the lone worker system 100 according to one or more embodiments is depicted. The process flow 300 begins at block 330, where the safety check application 114 and/or the server 130 activate a use-case safety monitoring. The safety check application 114 and/or the server 130 activate the use-case safety monitoring with respect to the service call to implement the safety check. The use-case safety monitoring detects one or more of connectivity, activity, and motion modes to determine an emergency.

For example, sub-blocks 332, 334, and 336 detail the types of detections that can be made by use-case safety monitoring. At sub-block 332, the safety check application 114 and/or the server 130 detects whether the connection 152 of FIG. 1 is present. At sub-block 334, the safety check application 114 detects whether activity is present with respect to the mobile device 110. Activity, in this regard, can include any user operation of the mobile device 110, such as making a phone call, changing a volume, adjusting brightness, turning on a phone light, etc. At sub-block 336, the safety check application 114 performs a motion detection. The motion detection can be performed utilizing the sensor 116 to detect/measure an acceleration of the mobile device 110). The motion detection can include a detection of a swift movement of the mobile device 110 that indicates that the elevator technician or building mechanic has fallen.

Upon event detection with respect to sub-blocks 332, 334, and 336, the process flow 300 can proceed to block 350. At block 350, the safety check application 114 executes an emergency timer. For instance, the safety check application 114 initiates a count by the emergency timer based on the detection of the emergency. Note that, in accordance with one or more embodiments, the emergency timer can be different based on whether the emergency timer was initiated within sub-block 332, 334, or 336. For example, a shorter count can be utilized by the emergency timer in the event of a detected fall in contrast to a lost connection scenario.

At block 360, the safety check application 114 initiates an emergency mode. The safety check application 114 can initiate the emergency mode in response to a conclusion of the count by the emergency timer. When the safety check application 114 is in the emergency mode, the safety check application 114 executes an emergency alert or call.

Figure 4:
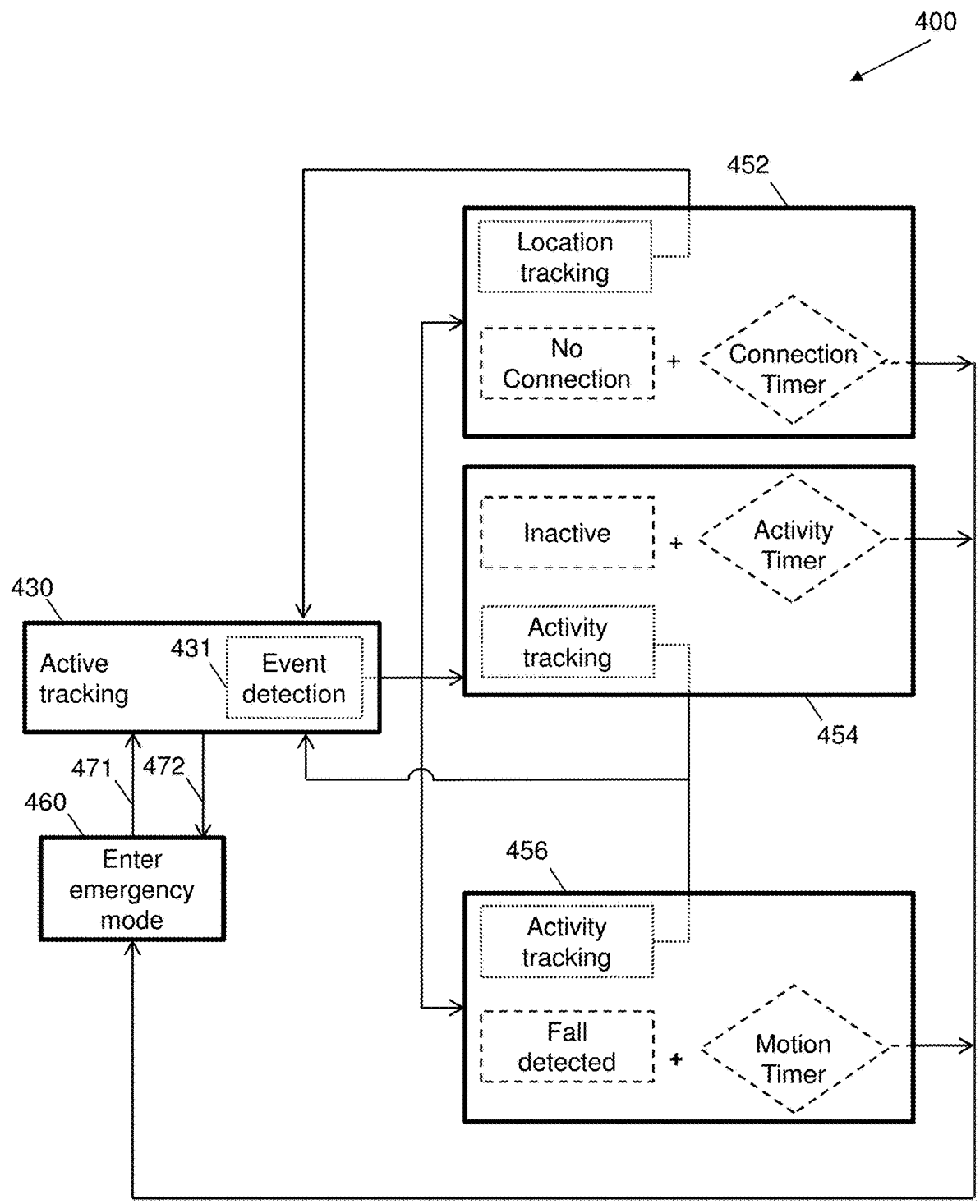
FIG. 4 depicts a process flow with respect to a lone worker system according to one or more embodiments.

Turning now to FIG. 4, a process flow 400 with respect to the lone worker system 100 according to one or more embodiments. The process flow 400 begins at block 430, where the safety check application 114 is actively tracking the operations of the mobile device 110. For instance, the safety check application 114 can utilize a use-case safety monitoring operation to detect whether the connection 152 is present, whether activity is present, and/or whether motion is present. If one or more of these events are present (e.g., event detection 431 occurs: disconnection event; inactive mobile device event; fall motion event), the process flow 400 proceeds to one or more of the corresponding blocks 452, 454, and 456 as described herein.

At block 452, the safety check application 114 continues to detect that there is no connection (e.g., connection 152 is disconnected). While no connection remains or while the connectivity of the mobile device 110 is absent, a connection timer operates a count. If the count concludes and the connection 152 does not return, then the process flow 400 proceeds to block 460. If the connection 152 returns before the count is concluded by the connection timer, the process flow 400 returns to active tracking the operations of the mobile device 110 at block 430. Note that the safety check application 114 can determine whether the connection 152 is present by detecting a location of the mobile device (if any connection is reinstated) and resetting the connection timer.

At block 454, the safety check application 114 continues to detect that there is no activity. While the mobile device 110 is inactive or while the activity by the mobile device 110 is absent, an activity timer operates a count. If the count concludes and no activity is detected, then the process flow 400 proceeds to block 460. If the mobile device 110 is used before the count is concluded by the activity timer, the process flow 400 returns to actively tracking the operations of the mobile device 110 at block 430.

At block 456, the safety check application 114 detects whether there is a subsequent motion (e.g., a motion indicating that the mobile device 110 was picked up after being dropped). According to one or more embodiments, if the sensor 116 determines that the mobile device 110 subsequently moves at a rate at or below 2.75 meters per second, then the motion is determined to be within a normal operation and the initial fall motion event can be disregarded.

Further, in response to detecting a fall motion event (e.g., swift movement of the mobile device 110), a motion timer operates a count. For instance, the safety check application 114 can initiate the count by the motion timer when the motion by the mobile device 110 exceeds a benchmark value. If the sensor 116 determines that the mobile device 110 moved at a rate above 2.75 meters per second (e.g., the benchmark value), then the process flow 400 proceeds to block 460 after a predetermined amount of time and/or if no subsequent motion is detected by the sensor 116 of the mobile device is absent (to avoid notifications for accidental phone drops). If the mobile device 110 is used before the count is concluded by the motion timer, the process flow 400 returns to actively tracking the operations of the mobile device 110 at block 430.

At block 460, the safety check application 114 enters the emergency mode. When the safety check application 114 is in the emergency mode, the safety check application 114 executes an emergency alert or call.

Note that the emergency mode can be enabled or disabled. For instance, as shown by arrows 471 and 472, the safety check application 114 can exit and enter the emergency mode actively tracking. Exit and enter can be manual operations. Manual activation can include when the building mechanic or elevator technician manually selects to enter the emergency mode (e.g., if the building mechanic or elevator technician is experience a heart attack). Manual deactivation can include when the building mechanic or elevator technician manually selects to exit the emergency mode (e.g., if the building mechanic or elevator technician accidently triggers the emergency mode and needs to cancel; if the safety check application 114 properly entered the emergency mode but an emergency did not exist).

In view of the embodiments of the lone worker system 100, it is noted that the safety check application improves the operations of the mobile device 110 and/or the server 130 by providing a mechanism thereon that detects emergencies which are otherwise not detectable by the mobile device 110 and/or the server 130.

Embodiments herein can include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments herein.

Aspects of the embodiments herein are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A lone worker system for performing a safety check, the lone worker system comprising:
    a mobile device comprising:
        a memory storing a safety check application thereon; and
        a processor, coupled to the memory, executing the safety check application; and
        wherein the processor initiates the safety check application with respect to a service call,
        wherein the safety check application executes a use-case safety monitoring of the mobile device implement the safety check,
        wherein the use-case safety monitoring detects an emergency situation in response to each of a connectivity of the mobile device to a server, an activity of the mobile device, and a motion of the mobile device,
        wherein detecting the connectivity of the mobile device to the server comprises determining if a connection exists between the mobile device and the server,
        wherein detecting the activity of the mobile device comprises detecting a use inactivity of a predefined time or longer,
        wherein the safety check application activates an emergency mode that escalates the service call in response the detection of the emergency situation by the use-case safety monitoring,
        wherein the safety check application executes an emergency alert at a conclusion of a count by an emergency timer of the safety check application under the emergency mode or the server executes an emergency call based on a communication from the safety check application of the mobile device under the emergency mode.

2. The lone worker system of claim 1, wherein the emergency alert comprises a notification to at least one of a supervisor, a call center operator, and emergency responder.

3. The lone worker system of claim 2, wherein the notification comprises at least one of an automatic phone call, an automatic email, and an automatic text message.

4. The lone worker system of claim 1, wherein the safety check application detects a location of the mobile device.

5. The lone worker system of claim 1, wherein the lone worker system comprises the server, and
    wherein the server is in communication with the mobile device.

6. The lone worker system of claim 5, wherein the server executes an emergency call based on the mobile device being out-of-communication at a conclusion of a count by an emergency timer.

7. The lone worker system of claim 1, wherein the safety check application determines the connectivity of the mobile device to the server by determining a location of the mobile device.

8. A processor-implemented method for performing a safety check, the processor-implemented method being implemented by a safety check application stored on a memory of a mobile device, the safety check application being executed by a processor of the mobile device, the processor being coupled to the memory, the processor-implemented method comprising:
    initiating, by the processor, the safety check application with respect to a service call;
    and
    executing, by the safety check application, a use-case safety monitoring of the mobile device to implement the safety check,
    wherein the use-case safety monitoring detects an emergency situation response to each of a connectivity of the mobile device to a server, an activity of the mobile device, and a motion of the mobile device,
    wherein detecting the connectivity of the mobile device to the server comprises determining if a connection exists between the mobile device and the server,
    wherein detecting the activity of the mobile device comprises detecting a use inactivity of a predefined time or longer,
    wherein the safety check application activates an emergency mode that escalates the service call in response the detection of the emergency situation by the use-case safety monitoring,
    wherein the safety check application executes an emergency alert at a conclusion of a count by an emergency timer of the safety check application under the emergency mode or the server executes an emergency call based on a communication from the safety check application of the mobile device under the emergency mode.

9. The lone worker system of claim 8, wherein the emergency alert comprises a notification to at least one of a supervisor, a call center operator, and emergency responder.

10. The lone worker system of claim 9, wherein the notification comprises at least one of an automatic phone call, an automatic email, and an automatic text message.

11. The processor-implemented method of claim 8, wherein the safety check application detects a location of the mobile device.

12. The processor-implemented method of claim 8, wherein the server is in communication with the mobile device.

13. The processor-implemented method of claim 12, wherein the server executes an emergency call based on the mobile device being out-of-communication at a conclusion of a count by an emergency timer.

14. The processor-implemented method of claim 8, wherein the safety check application determines the connectivity of the mobile device to the server by determining a location of the mobile device.

* * * * *